Feb. 16, 1932. R. M. ISHAM 1,845,665
PURIFICATION OF ALCOHOLS
Filed July 30, 1927
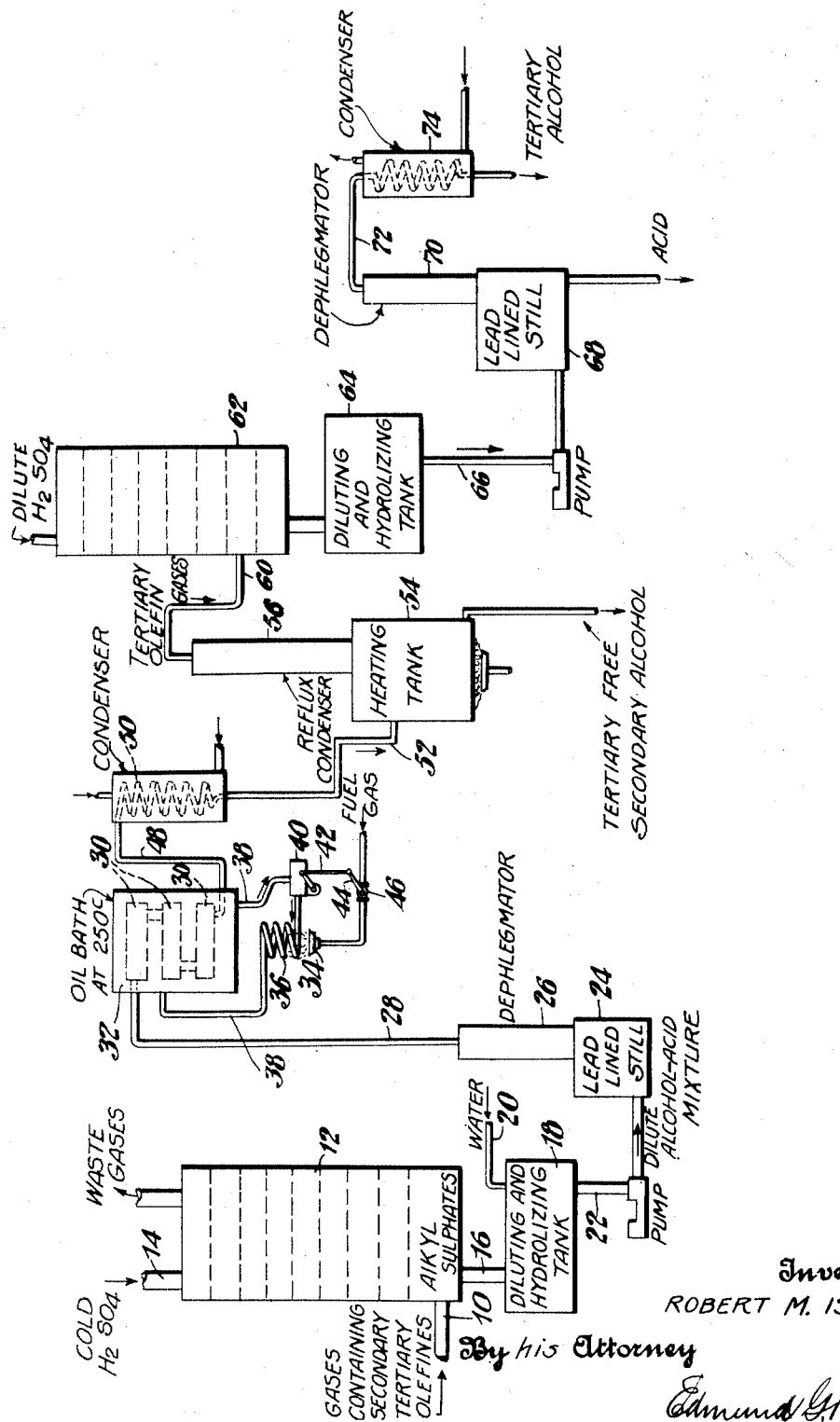
Inventor
ROBERT M. ISHAM
By his Attorney
Edmund G. Borden Patented Feb. 16, 1932

1,845,665

UNITED STATES PATENT OFFICE

ROBERT M. ISHAM, OF OKMULGEE, OKLAHOMA, ASSIGNOR TO DOHERTY RESEARCH COMPANY, OF NEW YORK, N. Y., A CORPORATION OF DELAWARE

PURIFICATION OF ALCOHOLS

Application filed July 30, 1927. Serial No. 209,407.

The present invention relates to the purification of alcohols.

The manufacture of secondary alcohols from olefines has become well established. The most important steps of the usual method for producing secondary alcohols from olefines are the absorption of the olefines in sulphuric acid, the hydrolyzation of the resulting alkyl sulphates, and the separation of the alcohols from the dilute sulphuric acid by distillation.

Usually the alcohols obtained from the hydrolyzed mixture are rectified to obtain cuts corresponding to the different secondary alcohols.

It has been found, however, that some of the olefines occurring in gases obtained by cracking oil are converted by the said process not into secondary alcohols, but into tertiary alcohols. For instance iso-butylene is converted into tertiary butyl alcohol. The tertiary alcohols dissolve in the secondary alcohols formed by said process and depreciate their value. For certain purposes it is required that the secondary alcohols be free from tertiary alcohols. It is difficult to separate tertiary alcohols from secondary alcohols by distillation because the boiling point of tertiary butyl alcohol is almost the same as that of secondary propyl or iso-propyl alcohol.

The principal object of the present invention is to provide a process whereby tertiary alcohols may be effectively removed from a mixture of alcohols.

The present invention is based on the discovery that tertiary alcohols are more readily dehydrated than other alcohols, particularly secondary alcohols.

I have found that secondary alcohols can be purified from tertiary alcohols by dehydrating the tertiary alcohols. The tertiary alcohols when dehydrated are converted into olefines and water, the olefines dissolving in the secondary alcohols. The secondary alcohols can, however, be readily removed from the dissolved olefines by heating under suitable conditions, secondary alcohols free from tertiary alcohols thereby being produced. At temperatures below 200° C. the tertiary alcohols break down so slowly that the process is not commercial unless a very active catalyst is available. Preferably the dehydration of the tertiary alcohols is carried out at about 250° C. in the presence of a catalyst which does not cause dehydration of secondary alcohols at this temperature. Under these conditions very little if any polymerization of the olefines occurs. However, any polymers so formed are comparatively high boiling compounds and are separated readily from the secondary alcohols in which they dissolve by rectification. If the tertiary alcohol secondary alcohol mixture is subjected to strongly dehydrating conditions, some of the secondary alcohol is dehydrated at the same time as the tertiary alcohol. However, the destruction of secondary alcohols does not occur at temperature of 250° C. or below unless a very active catalyst is used. In such a case, the temperature is maintained a convenient degree below the point at which the secondary alcohols begin to break down.

The olefines formed from the tertiary alcohols by dehydration are, as mentioned above, first dissolved in and then removed from the secondary alcohols by rectification with a reflux condenser. These olefines come off from the reflux condenser in substantially pure vaporous form. It is preferred according to the present invention to utilize these olefines to form tertiary alcohols. As the tertiary olefines are available in uncontaminated condition, they form a basis for the manufacture of cheap commercially pure tertiary alcohols by absorbing the olefines in cool sulphuric acid, hydrolyzing the resulting alkyl sulphates and distilling the dilute acid-alcohol mixture resulting from the hydrolysis, this method of making tertiary alcohols employing substantially the same steps as the ordinary method of making secondary alcohols from olefines.

It is preferred to carry out the purification of secondary from tertiary alcohols according to the present invention at the time the alcohols are distilled off from the acid-alcohol mixture after hydrolysis. In the accompanying drawing I have illustrated diagrammatically a suitable arrangement of apparatus for carrying out the present process of purifying secondary alcohols from contamination by tertiary alcohols. I have also illustrated diagrammatically in the accompanying drawing an arrangement for forming tertiary alcohols from the olefines formed by the dehydration of the tertiary alcohols originally contained in the secondary alcohols.

In the accompanying drawing forming part of this specification the figure illustrates a flow sheet of a diagrammatic apparatus for carrying out the process in accordance with the present invention.

*Example*

By way of example, a mixture of gases containing both secondary and tertiary olefines is introduced into the apparatus through the pipe 10. Pipe 10 delivers gases passing therethrough into the bottom of an absorber at 12. In the absorber 12 the gases from pipe 10 are brought into intimate contact with sulfuric acid to form alkyl sulfates from the secondary and tertiary olefines. Preferably the sulfuric acid is introduced into the absorber 12 at a relatively low temperature and passes through the absorber countercurrent to the gases from pipe 10. Sulfuric acid can be conveniently introduced at a point such as that indicated at 14 and a mixture of alkyl sulfates or alkyl sulfates and acid formed by the absorption is removed from the lower part of the absorber 12 by a pipe such as that indicated at 16. After the alkyl sulfates have been formed they are diluted and hydrolyzed to form alcohols. For this purpose, pipe 16 is connected to deliver the alkyl sulfates to a diluting and hydrolyzing tank 18. Water for diluting and hydrolyzing the alkyl sulfates may conveniently be introduced into tank 18 at a point such as 20. After diluting the alkyl sulfates, hydrolysis is accomplished preferably in tank 18 in the manner well-known to those skilled in this art to produce a mixture of alcohols and dilute acid. The dilute acid alcohol mixture is then distilled preferably in a lead lined still to separate the alcohol from the acid. The hydrolysis may, if desired, be accomplished simultaneously with the distillation of the dilute alkyl sulphates. For this purpose, the dilute alcohol-acid mixture is pumped from the chamber 18 through the connecting line 22 to the lead lined still 24. The dilute alcohol-acid mixture is heated in still 24 by any suitable means, preferably steam coils (not shown) to drive off the alcohols from the acid. Since the olefines introduced into scrubber 12 contain some tertiary olefines as well as a predominating percentage of secondary olefines the alcohol vapors from still 24 contain some tertiary alcohols which it is desired to eliminate from the secondary alcohols. The mixture of secondary and tertiary alcohol vapors leaving the still 24 passes through dephlegmator 26 in which the alcohol vapors are separated from any acid then entangled with the alcohols and from part of the water vapors.

Preferably the tertiary alcohol is eliminated from the secondary alcohol soon after the alcohol vapors leave the dephlegmator 26. For this purpose, the mixture of tertiary and secondary alcohol vapors is conducted through pipe 28 to a series of dehydrating tubes 30, 30 which are arranged in series and maintained at temperature conditions suitable to decompose the tertiary alcohols in the alcohol vapors. Preferably, the tubes 30 are maintained at a given constant temperature by an oil bath maintained in chamber 32 surrounding the tubes 30. In the arrangement illustrated the oil in the chamber 30 is heated to the desired temperature by a burner 34, the hot gases of which act on a coil 36 connected into a pipe 38 arranged to provide a circulation of the oil in the chamber 32. For this purpose, the pipe 38 is taken out of chamber 32 at or near the bottom of the chamber and is carried back into chamber 32 at or near the top of the chamber. A thermostat 40 is preferably provided in pipe 36 and arranged to control the flow of gas to burner 34 by means of a linkage 42 acting on a lever 44 of the gas valve 46, so as to maintain the oil in chamber 32 and thereby the tubes 30 at a substantially constant desired temperature. By controlling the amount of gas used by the burner 34, the temperature of the tubes 30 is maintained constant and preferably at a temperature of about 250° C. Preferably, tubes 30 should aggregate over 20 feet in length. The optimum temperature of the tubes 30 will depend on whether or not a catalyst is used therein and upon the nature of the catalyst employed in the tubes.

For any given catalyst, the temperature should preferably be such that all of the tertiary alcohol is dehydrated to form tertiary olefines and water, but without dehydrating or breaking down any material amount of the secondary alcohol. A catalyst of thoria carried on pumice is very satisfactory when used in tubes 30 at a temperature of 250° C. Such a catalyst can be prepared in a variety of ways. A suitable method of preparing the said thoria-pumice catalyst is by mixing thorium hydroxide with pumice, drying the mixture and then heating it. By another method pumice may be saturated with a solution of thorium nitrate, dried and the nitrate decomposed by heat. A number of substances may be used as catalysts for dehydrating the tertiary alcohols, for example alumina, zirconia, aluminum sulfate, kaolin, and titania may be used in place of thoria. Moreover, the tertiary alcohols dissolved in commercial secondary alcohol may be decomposed, although more slowly, by heat alone without a catalyst.

The vapors leaving the catalyst tubes 30 are condensed and for this purpose, the vapors from the last of the tubes 30 are conducted by pipe 48 into the coil of the condenser 50. The resulting condensate is a mixture of secondary alcohol and tertiary olefine. This mixture is conducted through pipe 52 to a tank 54 in which the mixture from condenser 50 is heated under reflux condenser 56. Condenser 56 permits the olefines to separate from the secondary alcohol and the tertiary-free secondary alcohol is thereupon discharged from tank 54 through pipe 58. The tertiary olefine gases discharged from the reflux condenser 56 through pipe 60 are substantially uncontaminated by other than tertiary material and may be utilized in a variety of ways. Preferably according to the present invention tertiary olefine gases from pipe 60 are utilized as the source of commercially pure tertiary alcohol. For this purpose, the pipe 60 is connected into the absorber 62 forming part of an alcohol apparatus similar to that used in making secondary alcohols. In the absorber 62, the tertiary olefines are absorbed in dilute sulfuric acid or other suitable acid reagent and the resulting tertiary alkyl sulfate hydrolyzed and distilled to form tertiary alcohol. In the apparatus as illustrated, tertiary alkyl sulfate is discharged into a diluting and hydrolyzing tank 64 from which the hydrolyzed mixture of dilute acid and tertiary alcohol is pumped through pipe 66 into still 68. The acid tertiary alcohol mixture is heated in still 68 to drive off alcohol vapors through a dephlegmator 70 and pipe 72 into the condensing coil of a condenser 74 from which the commercially pure tertiary alcohol is collected and conducted to storage.

Secondary alcohols which have been treated as just described give only a slight reaction when boiled with the Denige reagent, indicating that removal of the tertiary alcohols has been substantially complete.

It will be understood that, while the herein described process has been developed and is particularly advantageous for removing tertiary alcohols from secondary alcohols, its present invention is not limited to use with secondary alcohols, but may be applied for the removal of tertiary alcohols from primary as well as from secondary alcohols.

Having thus described my invention, I claim:

1. The process of increasing the purity of alcohol containing tertiary alcohol which comprises dehydrating said tertiary alcohol by heating the alcohol to a temperature of approximately 250° C. to form olefine and water and removing said olefine from the alcohol.

2. The process of increasing the purity of alcohol containing tertiary alcohol which comprises dehydrating said tertiary alcohol by heating the alcohol to a temperature of from 200 to 250° C. in the presence of a catalyst adapted to accelerate the dehydrating reaction to form olefine and water, and removing said olefine from the alcohol by distillation.

3. The process of increasing the purity of alcohol containing tertiary alcohol which comprises dehydrating said tertiary alcohol by heating the alcohol to a temperature approximating 200° C. to form olefine and water, and removing said olefine from the alcohol by a refluxing action.

4. The process of purifying a secondary alcohol to remove tertiary alcohol therefrom, which comprises passing the impure secondary alcohol in contact with a dehydrating catalyst maintained at a temperature of about 200° C., whereby the tertiary alcohol contained therein is decomposed and separately recovering the purified secondary alcohol from the decomposition products of the tertiary alcohol.

5. The process defined by claim 4 in which the said catalyst comprises thoria.

6. The process defined by claim 4 in which the said catalyst comprises alumina.

7. The process defined by claim 4 in which the said catalyst comprises zirconia.

8. The combined process of purifying secondary alcohols to remove tertiary alcohols therefrom and to produce a relatively pure raw material for the manufacture of tertiary alcohols, which comprises heating the impure secondary alcohols to a temperature of about 250° C. to thereby convert the tertiary alcohols present to the corresponding olefines, and separating the secondary alcohols from the decomposition products of the tertiary alcohols.

9. The process defined by claim 8 in which said heating is conducted in the presence of a catalytic substance comprising alumina.

10. The process defined by claim 8 in which said heat is conducted in the presence of a catalytic substance comprising zirconia.

11. The process defined by claim 8 in which said heat is conducted in the presence of a catalytic substance comprising thoria.

12. A continuous process for purifying secondary alcohols to remove tertiary alcohols therefrom, which comprises passing the impure secondary alcohol in vapor phase through a heating zone maintained at a temperature adapted to decompose the tertiary alcohols present therein, but insufficiently high to decompose substantially portions of the said secondary alcohols, said temperature being maintained at a point approximating 250° C., and separately recovering the purified secondary alcohol and decomposition products of the tertiary alcohols.

13. The combined process of purifying an alcohol of its content of tertiary alcohol and simultaneously producing a relatively pure raw material for the manufacture of tertiary alcohols, which comprises selectively decomposing the tertiary alcohol in the impure alcohol by heating the impure alcohol to a temperature of about 200° C. while passing it in contact with a dehydrating catalyst adapted to accelerate the decomposition of the tertiary alcohols to olefines, and separately recovering the olefine decomposition product from the purified alcohol.

In testimony whereof I affix my signature.

ROBERT M. ISHAM.